T. S. MILLER.
CABLEWAY.
APPLICATION FILED MAR. 18, 1909.

984,486.

Patented Feb. 14, 1911.
4 SHEETS—SHEET 1.

WITNESSES

INVENTOR

BY

ATTORNEYS

T. S. MILLER.
CABLEWAY.
APPLICATION FILED MAR. 18, 1909.
984,486.
Patented Feb. 14, 1911.
4 SHEETS—SHEET 2.
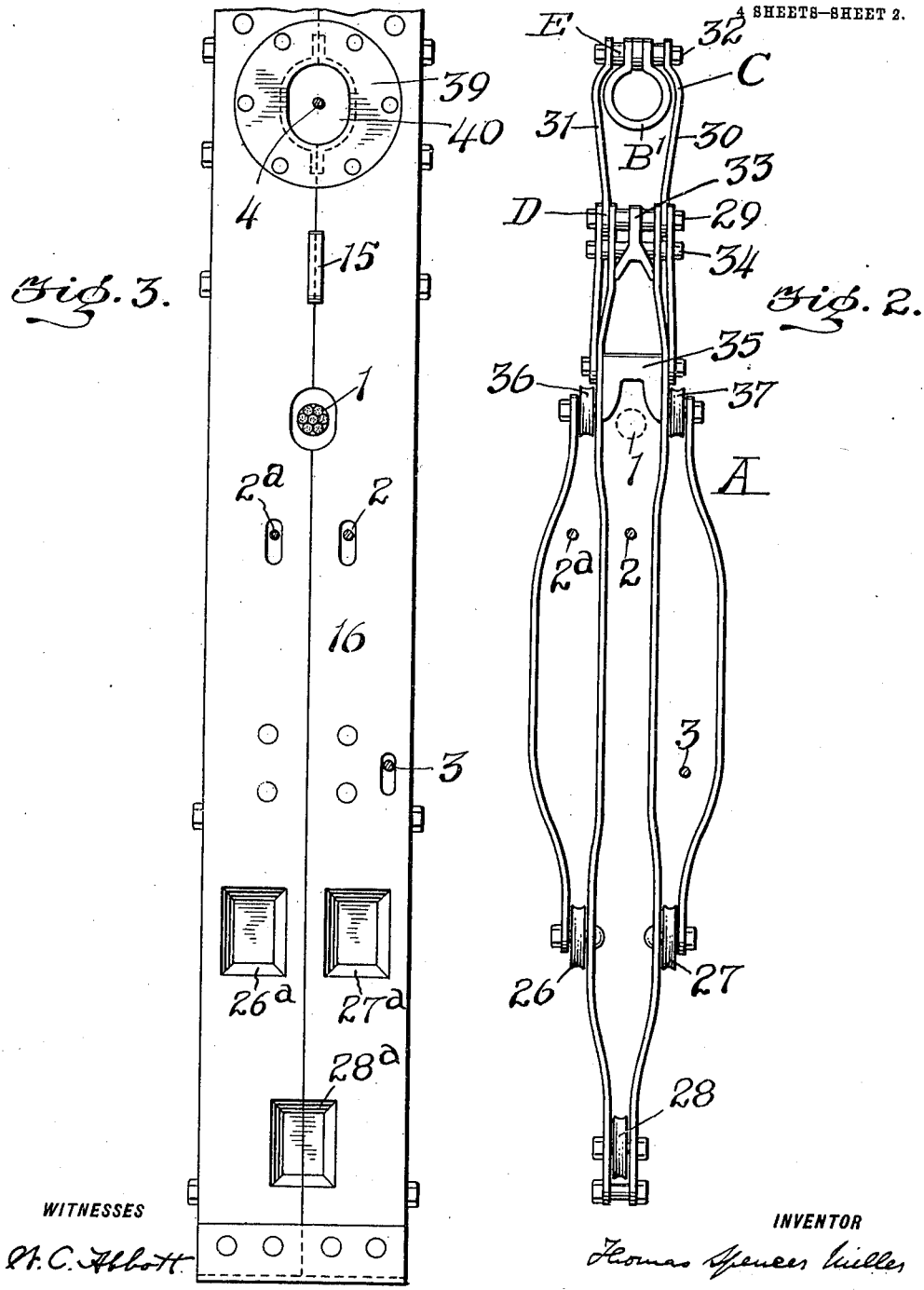
WITNESSES
INVENTOR
Thomas Spencer Miller
BY
Gifford & Bull
his ATTORNEYS

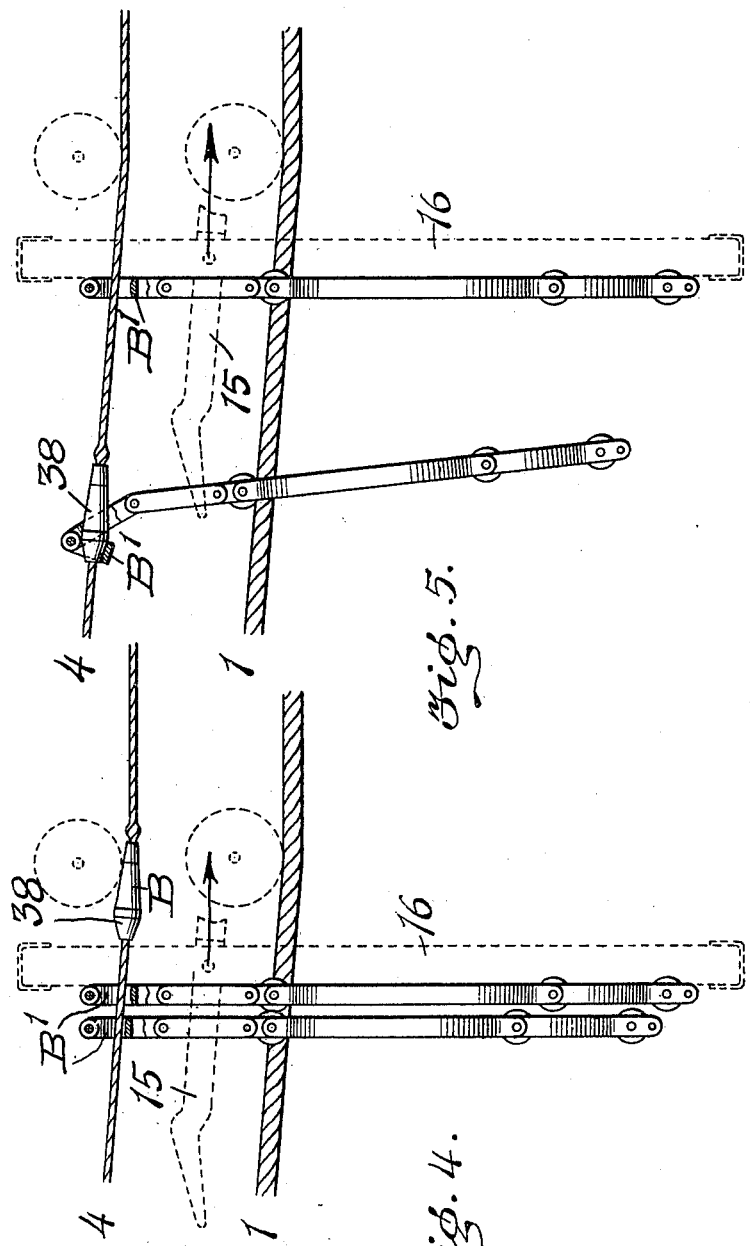

T. S. MILLER.
CABLEWAY.
APPLICATION FILED MAR. 18, 1909.

984,486.

Patented Feb. 14, 1911.
4 SHEETS—SHEET 4.

WITNESSES
H. C. Abbott
W. A. Pauling

INVENTOR
Thomas Spencer Miller
BY
Gifford & Bull
his ATTORNEYS

UNITED STATES PATENT OFFICE.

THOMAS SPENCER MILLER, OF SOUTH ORANGE, NEW JERSEY.

CABLEWAY.

984,486.

Specification of Letters Patent.

Patented Feb. 14, 1911.

Application filed March 18, 1909. Serial No. 484,101.

*To all whom it may concern:*

Be it known that I, THOMAS SPENCER MILLER, a citizen of the United States, and a resident of South Orange, county of Essex, and State of New Jersey, have invented a new and useful Improvement in Cableways, of which the following is a specification.

This invention relates more particularly to that class of cableways containing supporting rope-carriers arrested by stops. In this class of cableways the maximum safe speed of the load carriage heretofore attainable has been about 1000 feet per minute. Beyond that speed the fall rope carriers have not been able to withstand the shock of impact with the stops. The primary problem which my invention is designed to solve is to enable cableways of this class to be run with durability and efficiency at much higher rates of speed, and so successful have I been in solving this problem that I have succeeded in attaining a speed as high as three times that above referred to, viz 3000 feet per minute.

Figure 1:
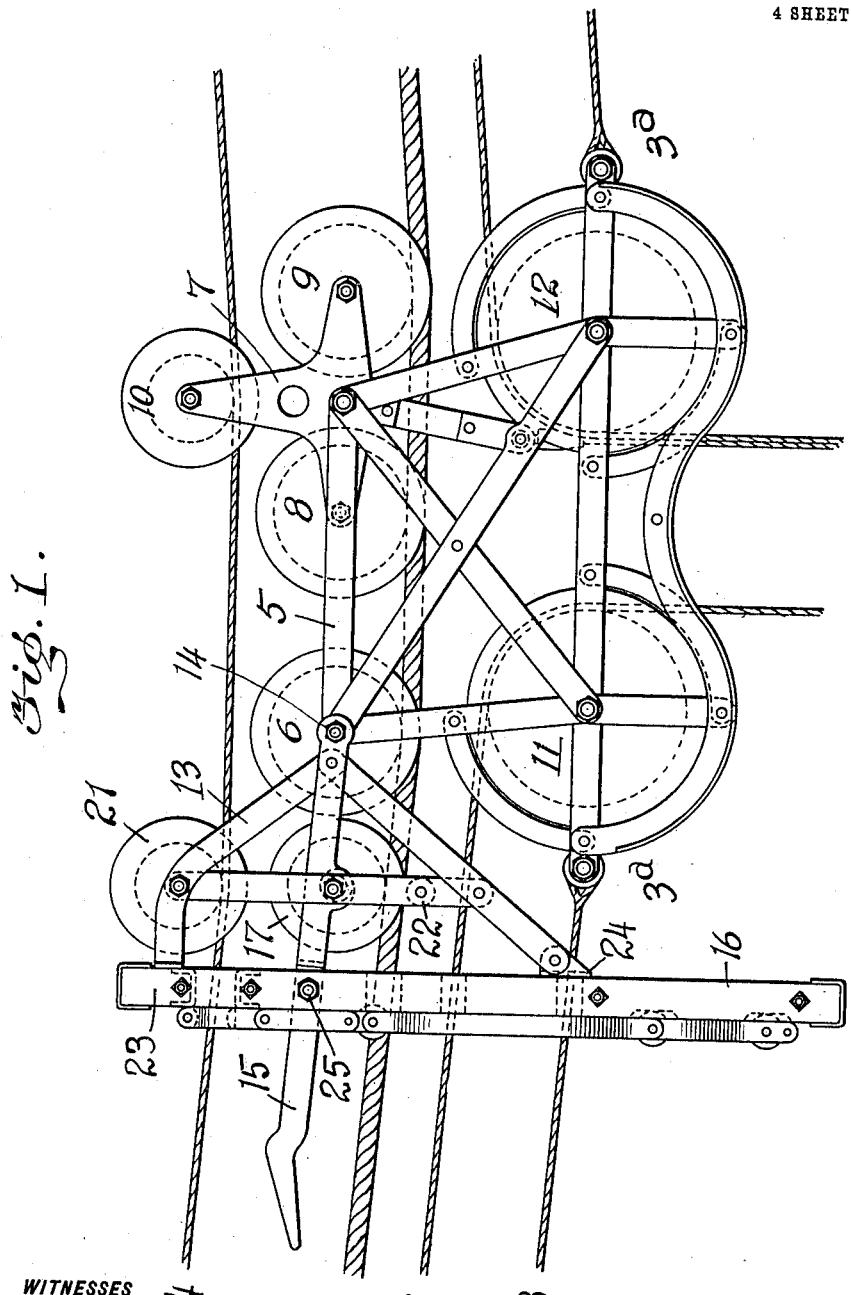
Figure 6:
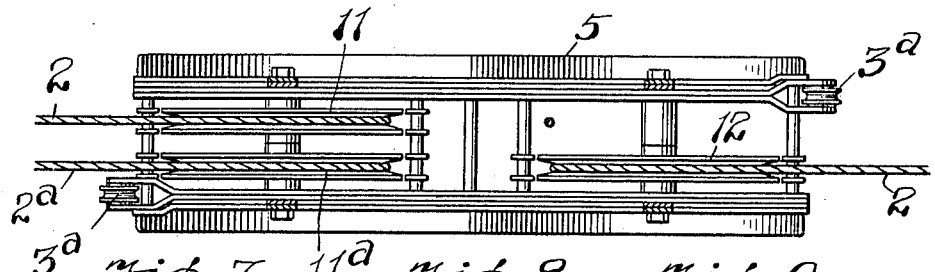

In the accompanying drawings, Figure 1 is a side view of a load carriage, a fall rope carrier and the coöperating ropes of a cableway of the class above referred to. Fig. 2 is an end view of the fall rope carrier. Fig. 3 is an end view of the buffer of the load carriage against which the fall rope carrier rests. Figs. 4 and 5 represent the fall rope carrier in action. Figs. 6 to 11 are details.

1 is the main cable; 2, the hoisting rope; 3, the traversing or traction rope; 4, the button-stop-rope, all of which are supported and operated in the manner and by the means well known.

5 is the main frame of the load carriage carrying the wheel 6 and a pivoted equalizing frame 7 carrying the wheels 8, 9 and 10. The wheels 6, 8 and 9 run upon the main cable and the pivoted frame 7 enables the wheels 8 and 9 to adjust themselves to the inclination of the cable. The hoisting rope sheaves 11, 12, are mounted upon the main frame 5. The wheel 10 on the pivoted equalizing frame 7 engages the button-rope, as shown.

13 is a frame pivoted to the main frame at 14. The function of this frame is to support the horn 15 and the buffer 16.

Figure 10:
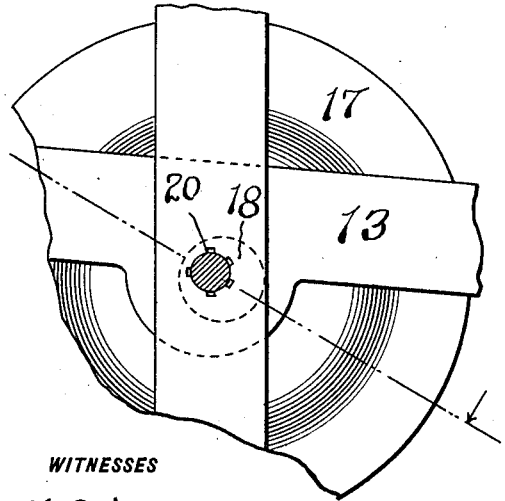
Figure 11:
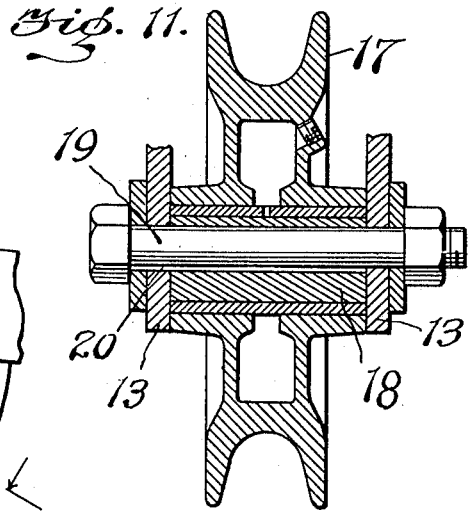

17 is a wheel shown in detail in Figs. 10 and 11 and which runs upon the main cable 1. This wheel carries the pivotal frame 13 and has an adjustable bearing therein. This wheel 17 maintains approximate parallelism between the horn 15 and the main cable; the variation from such parallelism at various points on the cable being so limited as not to interfere with the proper operation of the horn. Whether the cable is loaded lightly or heavily, and whether the load carriage is at the middle or the end of the span, the horn is thus self-adjusting in position, which I regard as of great importance particularly in a high speed cableway. In order to provide for adjustment between the wheel 17 and the frame 13, which adjustment is essential to compensate for wear of the wheel 6 or wheel 17, I provide an eccentric bearing 18 for the wheel 17, as clearly indicated in Figs. 10 and 11. This eccentric bearing is mounted upon the pin 19 passing through the frame 13, and the wheel 17 turns freely upon the eccentric bearing in whatever position it may be adjusted. The eccentric bearing is keyed to the frame 13 by a key 20. There are several notches in the frame at various points of the periphery of the pin 19 to receive this key, as shown in Fig. 10, and by removing the key, turning the eccentric bearing 18, and inserting the key in another notch, the eccentric bearing may be adjusted and fixed in any position desired.

21 is a wheel mounted on the frame 13 and bearing upon the top of the button-rope 4. The purpose of the wheels 21 and 10 is to maintain parallelism between the button-rope and the cable. The wheel 21 also maintains parallelism between the rope 4 and the horn 15 and maintains the proper relative position between the carrier A, when on the horn, and the rope 4.

22 is a safety wheel that may be employed to prevent accident due to the abnormal lifting of the frame 13 by an undue strain on the button-rope 4. The buffer 16 in the form shown in the drawing, is constructed of wood or other soft material. It is fixed to the pivotal frame 13 at 23 above the button-rope and at 24. It is fixed to the horn at 25. It is provided with openings to permit the passage of the horn 15 and the cable 1. It is also provided with the holes to permit the passage of the hoisting ropes 2, 2ª and traction rope 3; also, with the hole 40 reinforced by a plate 39 to admit the passage of the button-rope 4; also, with pockets 26ᵃ, 27ᵃ and 28ᵃ to receive the fall rope carrier sheaves 26, 27 and 28 lying against it, as shown in Fig. 4.

Between the body A of each fall rope carrier and the body B of its coöperating button, is introduced an impact member C, being the member which is to receive primarily the impact of the collision between the fall rope carrier and the button. This impact member is provided with a lost-motion-connection with the part upon which it is mounted. The lost motion thus introduced at the moment of impact between the body of the carrier and the body of the button or stop relieves the force of the blow by giving the body of the carrier time within which to lose its momentum.

In the form of construction shown in the drawings, the impact member C is shown as mounted upon the fall-rope carrier itself but it might be mounted upon the button or stop or on the button-rope. In the form shown in the drawing, the lost-motion-connection is between the impact member and the body of the fall rope carrier and it consists, as there shown, of a vibrative connection capable of bowing under the force of the impact and thus affording the requisite lost motion. More specifically, still, it consists of a pivotal connection between the impact member C and the carrier body A. More specifically, still, it consists of the two pivotal connections D and E between the body A of the carrier body A and the impact member C. These two pivotal connections are afforded by pivoting upon the pin 29 the uprights 30 and 31 connected at the top by the pin 32 and hanging the impact member C pivotally upon said pin 32 between said uprights 30 and 31. It will be observed that this construction involves a lost-motion-connection between the impact member C and its support; that this lost-motion-connection is more specifically a vibrative connection and more specifically still, a pivotal connection and more specifically still, a double vibrative or double pivotal connection. Since, however, I believe I am the first to embody this principle broadly, I do not wish to be understood as limiting myself to the specific forms of its embodiment, as shown or as above described, being well aware that this lost-motion-connection may be made in other ways than that shown, as, for example, by having the impact member connected with or even carried by a spring, either as an adjunct to or substitute for the vibrative connection shown; the spring permitting the described lost motion. Moreover, as above suggested, the impact member might be mounted on the button or button-rope instead of on the carrier and the lost-motion-connection interposed between the impact member and the body of the button or stop instead of between the impact member and the body of the carrier.

In the particular form of construction shown in the drawings, the lost-motion-return, or, in other words, the return of the impact member to its normal position, is produced automatically by the tension (generally produced by a counterweight) on the button-rope 4, and is completed by the impact of the buffer 16 against the carrier as it is picked up on the horn by the return of the load carriage. It will be observed that the impact member C consists of an eye of approximately circular form. This circular form affords the maximum strength with the minimum weight, the importance of which will be appreciated when it is considered that the force of the impact increases not only with the square of the velocity but also directly as the weight is increased.

33 is the horn-block in the form of a saddle adapted to rest on the horn. It is fixed to the body of the carrier by the bolts 29 and 34. 35 is the main cable block also in the form of a saddle adapted to rest on the main cable.

26 is the sheave by which the rope 2ᵃ is carried when slack.

27 is the sheave by which the rope 2ᵇ is carried when slack.

Figure 7:
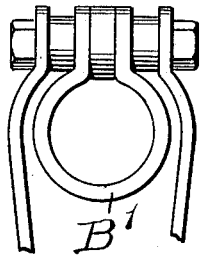
Figure 8:
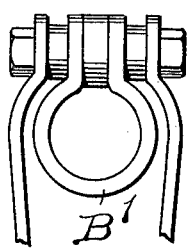
Figure 9:
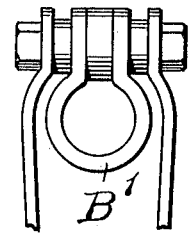

28 is the sheave by which the rope 3 is carried when slack. The sheave 36 is provided above the sheave 26 so that if the rope 2ᵃ should be raised by extreme tension as high as the main cable, it will not carry the carrier along with it. The same function is performed by the friction sheave 37 with respect to the rope 3. The eyes B' of the successive rope-carriers of a series will be graduated in size, as shown in Figs. 7, 8 and 9, so as to coöperate with the corresponding graduation in the size of the buttons by which they are respectively to be stopped.

The operation is as follows: In Fig. 4, I have shown two fall rope carriers in the position which they occupy when being carried on the horn of the load carriage; the carriage receding so that the eyes of the fall rope carriers are approaching the button-stop B. In Fig. 5, the load carriage has receded about the length of the horn; the result being that the button 38 has passed through the eye of the first carrier (such eye being large enough to permit its passage) and has collided with the eye of the second carrier (such eye being too small to admit of its passage). The shock of the collision has caused the head to vibrate upon the body A and the eye to vibrate upon the head into the position shown in Fig. 5. This vibrative motion kills the violence of the shock, prevents it from shattering the materials of the carrier and provides sufficient lost motion to cause all parts of the carrier to lose headway under impact against the button without rupture. It also relieves the button itself from the full force of the impact.

Having thus described my invention, what I claim is:

1. In a cableway, in combination, a rope carrier, a stop, an impact member and a lost-motion-connection for said impact member.

2. In a cableway, in combination, a rope carrier, a stop, an impact member and a vibrative connection for said impact member.

3. In a cableway, in combination, a rope carrier, a stop, an impact member, a double vibrative connection for said impact member.

4. In a cableway, in combination, a rope carrier, a stop, an impact member, a pivotal connection for said impact member.

5. In a cableway, in combination, a rope carrier, a stop, an impact member, a double pivotal connection for said impact member.

6. In a fall rope carrier, in combination with the body of the carrier, an impact member and a lost-motion-connection.

7. In a fall rope carrier, in combination with the body of the carrier, an impact member and a vibrative connection.

8. In a fall rope carrier, in combination with the body of the carrier, an impact member and a double vibrative connection.

9. In a fall rope carrier, in combination with the body of the carrier, an impact member and a pivotal connection.

10. In a fall rope carrier, in combination with the body of the carrier, an impact member and a double pivotal connection.

11. In a fall rope carrier, in combination, the body of the carrier and a head consisting of two uprights and an impact member pivotally suspended between said uprights.

12. In a fall rope carrier, in combination, the body of the carrier and an impact member consisting of an approximately circular eye.

13. In a cableway, in combination, a rope carrier, a stop and an impact member consisting of an approximately circular eye of less diameter than said stop.

14. In a cableway, in combination, a rope carrier containing an impact member consisting of an approximately circular eye, a stop rope extending through said eye and a stop of greater diameter than said eye.

15. In a fall rope carrier, in combination, with the body of the carrier, an impact member consisting of a swinging eye.

16. In combination, a suspended cable or trackway, a load carriage to travel thereon, a pivoted horn on the carriage supported at its swinging end on the main cable, a fall rope carrier adapted to be engaged by said horn, a stop, and an impact member on the fall rope carrier to coöperate with the stop.

17. In combination, a suspended cable or trackway, a load carriage to travel thereon, a fall rope carrier, a stop rope, an eye on the fall rope carrier through which the stop rope extends, and means on the carriage for centering the stop rope in the eye.

18. In combination, a suspended cable or trackway, a load carriage to travel thereon, a fall rope carrier, a stop rope, an impact eye on the fall rope carrier through which the stop rope extends, and means on the carriage for centering the stop rope in the impact eye.

19. In combination, a suspended cable or trackway, a load carriage to travel thereon, a stop rope, a horn on the load carriage, a fall rope carrier having a horn-receiving part located between the main cable and the stop rope, and means for maintaining the horn in position to properly engage said horn-receiving part on the carrier.

20. In a cableway, in combination, a suspended cable or trackway, a load carriage to travel thereon, a pivoted frame on the carriage, a horn mounted on the frame, a fall rope carrier, a stop, an impact member carried at the head of the fall rope carrier, and a wheel journaled on said pivoted frame and adapted to run on the cable.

21. In combination, a suspended cable or trackway, a load carriage to travel thereon, a horn on the carriage, a stop rope, a fall rope carrier adapted to be carried by said horn, an impact eye on the fall rope carrier through which the stop rope extends, and means on the carriage for centering the stop rope in the eye and maintaining the horn in proper position to support the fall rope carrier.

22. In combination, a suspended cable or trackway, a load carriage to travel thereon, a fall rope carrier, a stop rope, an eye on the fall rope carrier through which the stop rope extends, and means on the carriage for supporting the fall rope carrier relative to the stop rope so that the latter is substantially centered in said eye.

23. In combination, a suspended cable or trackway, a load carriage to travel thereon, a fall rope carrier, a stop rope, an eye on the fall rope carrier through which the stop rope extends, a horn on the carriage for supporting the fall rope carrier, and means for regulating the position of the horn to support the fall rope carrier in such a position that the button rope is substantially centered in said eye.

24. In combination, a suspended cable or trackway, a load carriage to travel thereon, a fall rope carrier, a stop rope, a part on the fall rope carrier through which the stop rope extends, and means on the carriage for substantially centering the stop rope in said part.

25. In combination, a suspended cable or trackway, a load carriage to travel thereon, a fall rope carrier, a stop rope, a part on the fall rope carrier through which the stop rope extends, and means for substantially centering the stop rope in said part.

26. In combination, a suspended cable or trackway, a load carriage to travel thereon, a fall rope carrier, a stop rope, an impact part on the fall rope carrier through which the stop rope extends, and means tending to hold the stop rope out of contact with said part.

In testimony whereof, I have hereunto signed my name in the presence of two subscribing witnesses.

THOMAS SPENCER MILLER.

Witnesses:
ERNEST PULSFORD,
HANY J. T. SMITH.